(12) United States Patent
Guo et al.

(10) Patent No.: US 12,331,871 B2
(45) Date of Patent: Jun. 17, 2025

(54) BRACKET STRUCTURE, SUB-DISPLAY PANEL ASSEMBLY AND TILED DISPLAY DEVICE

(71) Applicants: BOE MLED Technology Co., Ltd., Beijing (CN); BOE Technology Group Co., Ltd., Beijing (CN)

(72) Inventors: Shaofei Guo, Beijing (CN); Shipeng Wang, Beijing (CN); Chao Tian, Beijing (CN); Jianfeng Wang, Beijing (CN); Jiaxing Yuan, Beijing (CN); Jianbai Tan, Beijing (CN)

(73) Assignees: BOE MLED Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/557,593

(22) PCT Filed: Oct. 31, 2022

(86) PCT No.: PCT/CN2022/128560
§ 371 (c)(1),
(2) Date: Oct. 27, 2023

(87) PCT Pub. No.: WO2024/092389
PCT Pub. Date: May 10, 2024

(65) Prior Publication Data
US 2025/0084951 A1     Mar. 13, 2025

(51) Int. Cl.
*F16M 11/04*     (2006.01)
*F16M 11/18*     (2006.01)

(52) U.S. Cl.
CPC ............. *F16M 11/04* (2013.01); *F16M 11/18* (2013.01)

(58) Field of Classification Search
CPC ................................ F16M 11/04; F16M 11/18
USPC ......................................................... 248/274.1
See application file for complete search history.

(56) References Cited

U.S. PATENT DOCUMENTS 11,825,626 B1 * 11/2023 Li ........................ H05K 7/1489
2013/0160315 A1 * 6/2013 Shen ...................... G01D 11/30
33/613

* cited by examiner

*Primary Examiner* — Todd M Epps
(74) *Attorney, Agent, or Firm* — Ling Wu; Stephen Yang; Ling and Yang Intellectual Property

(57) ABSTRACT

The present disclosure provides a bracket structure. The bracket structure includes a bracket body and at least one transmission adjustment structure, wherein the bracket body includes a supporting portion, an assembly portion and a connecting portion, wherein the supporting portion and the assembly portion are disposed opposite in a first direction, the connecting portion is located between the supporting portion and the assembly portion and the connecting portion has a first side surface; the transmission adjustment structure is located between the supporting portion and the assembly portion, and includes an adjustment member, a transmission member connected with the adjustment member and a response member connected with the transmission member; the adjustment member is located between the supporting portion and the assembly portion and close to the first side surface.

20 Claims, 10 Drawing Sheets

BRACKET STRUCTURE, SUB-DISPLAY PANEL ASSEMBLY AND TILED DISPLAY DEVICE

CROSS-REFERENCE TO RELATED APPLICATION

The present application is a U.S. National Phase Entry of International Application No. PCT/CN2022/128560 having an international filing date of Oct. 31, 2022. The above-identified application is hereby incorporated by reference.

TECHNICAL FIELD

The present invention relates to the field of display, in particular to a bracket structure, a sub-display panel member and a tiled display device.

BACKGROUND

With rapid development of display technologies, tiled display devices have been more and more widely used in large sites such as shopping malls, cinemas, stadiums, etc. The tiled display devices not only solve technical problems of high cost and difficult maintenance of a single large screen, but also have high scalability and can be applied to the display of images in various sizes.

The tiled display device is formed by tiling a plurality of sub-display panel assemblies, wherein each sub-display panel assembly includes a display substrate and a bracket structure for supporting the display substrate.

SUMMARY

In a first aspect, a bracket structure is provided in an embodiment of the present disclosure, which includes a bracket body and at least one transmission adjustment structure, wherein the bracket body includes a supporting portion, an assembly portion and a connecting portion, wherein the supporting portion and the assembly portion are disposed opposite in a first direction, the connecting portion is located between the supporting portion and the assembly portion and is connected with both the supporting portion and the assembly portion, and the connecting portion has a first side surface;

the transmission adjustment structure is located between the supporting portion and the assembly portion, and includes an adjustment member, a transmission member connected with the adjustment member and a response member connected with the transmission member;

the adjustment member is located between the supporting portion and the assembly portion and close to the first side surface, at least a part of the adjustment member is located at a side of the first side surface away from the bracket body for external adjustment, and the adjustment member is configured to drive the transmission member to move in response to the external adjustment;

a second hole penetrating the assembly portion in the first direction is provided in a position of the assembly portion corresponding to the response member, the response member is configured to move along the second hole in response to a control of movement of the transmission member, and a part of the response member can extend from a side surface of the assembly portion away from the support portion through the second hole.

In some embodiments, the connection portion further has a second side surface disposed opposite to the first side surface in a second direction, and the response member is located between the support portion and the assembly portion and close to the second side.

In some embodiments, the adjustment member includes a first rotating member having a first rotating shaft, wherein the first rotating shaft extends in a direction parallel to the first direction, and the first rotating member is configured to rotate on the first rotating shaft in response to the external adjustment and drive the transmission member to move in response to external adjustment;

the response member includes one or more second rotating members connected with the transmission member, the first rotating member has a second rotational shaft that extends in a direction parallel to the first direction, and the second rotating member is configured to rotate on the second rotational shaft in response to the control of the movement of the transmission member and to move along the second hole.

In some embodiments, the first rotating member includes a first adjusting runner and a first connecting runner disposed in the first direction, at least a part of the first adjusting runner is located on the side of the first side surface away from the bracket body for external adjustment, and the first adjusting runner is configured to rotate on the first rotation shaft in response to external adjustment and to drive the first connecting runner to rotate synchronously on the first rotation shaft;

the second rotating member includes a second connecting runner and a second screw disposed along the first direction, wherein the second screw extends along the first direction, and an internal thread matched with an external thread of the second screw is provided in the second hole;

the transmission member is connected with both the first connecting runner and the second connecting runner, and the transmission member is configured to drive the second connecting runner to rotate about the second rotation shaft in response to the first connecting runner rotating about the first rotation shaft;

the second screw is connected with the second connecting runner and is capable of following the second connecting runner to rotate on the second rotating shaft, so as to move along the second hole.

In some embodiments, the response member further includes a second adjusting runner, and the second adjusting runner and the second screw are disposed along the first direction;

the second adjusting runner is connected with the second connecting runner, and the second adjusting runner is located between the second connecting runner and the second screw, or the second adjusting runner is located on a side of the second connecting runner away from the second screw;

at least part of the second adjusting runner is located on a side of at least one side surface of the connecting portion away from the bracket body for external adjustment, and the second adjusting runner is configured to rotate along the second rotating shaft in response to the external adjustment and drive the second screw to rotate synchronously.

In some embodiments, a fourth hole is provided at a position directly corresponding to the second hole, on a side surface of the support portion facing the assembly portion;
  a second guide rod is provided on a side of the second rotating member away from the second hole, an end of the second guide rod away from the support portion is connected with the second rotating member, an end of the second guide rod close to the support portion extends into a corresponding fourth hole and is configured to be movable along the fourth hole.

In some embodiments, the adjustment member further includes a first connecting rod corresponding to the first rotating member, and the first connecting rod extends in the first direction;
  one end of the first connecting rod is connected with the assembly portion, and the first adjusting runner and the first connecting runner are sleeved outside the first connecting rod, such that the first adjusting runner and the first connecting runner rotate about the first connecting rod.

In some embodiments, the bracket structure includes at least two transmission adjustment structures;
  first rotating members in the at least two transmission adjustment structures correspond to a same first connecting rod, and each of the first rotating members corresponding to the same first connecting rod is disposed in sequence along the first direction.

In some embodiments, the adjustment member further includes a third adjusting runner corresponding to the first connecting rod, wherein the third adjusting runner is connected with the corresponding first connecting rod, at least a part of the third adjusting runner is located on a side of the first side away from the bracket body for external adjustment, and the third adjusting runner is configured to rotate about the first rotation shaft in response to the external adjustment and to drive the first connecting rod to rotate about the first rotation shaft;
  a first hole penetrating the assembly portion along the first direction is provided in a position of the assembly portion corresponding to the first connecting rod, a part of the first connecting rod away from the supporting portion is a first screw, an internal thread matched with an external thread on the first screw is provided in the first hole, the first screw is disposed to move along the first hole when rotating about the first rotating shaft, and a part of the first screw can extend from the side surface of the assembly portion away from the supporting portion through the first hole.

In some embodiments, the third adjusting runner is sleeved outside the first connecting rod and fixed to the first connecting rod;
  or the third adjusting runner is fixed at one end of the first connecting rod away from the assembly portion.

In some embodiments, a third hole is provided at a position directly corresponding to the first hole, on a side surface of the support portion facing the assembly portion;
  a first guide rod is provided on a side of the third adjusting runner away from the first hole, the end of the second guide rod away from the support portion is connected with the second rotating member, the end of the second guide rod close to the support portion extends into a corresponding third hole and is configured to be movable along the third hole.

In some embodiments, the adjustment member further includes a first connecting rod corresponding to the first rotating member, the first connecting rod extends in the first direction, and the first connecting rod is fixed to a corresponding first rotating member to follow the first rotating member to rotate on the first rotation shaft;
  a first hole penetrating the assembly portion along the first direction is provided in a position of the assembly portion corresponding to the first connecting rod, a part of the first connecting rod away from the supporting portion is a first screw, an internal thread matched with an external thread on the first screw is provided in the first hole, the first screw is disposed to move along the first hole when rotating about the first rotating shaft, and a part of the first screw can extend from the side surface of the assembly portion away from the supporting portion through the first hole.

In some embodiments, the connection portion further has a third side surface and a fourth side surface connected to the first side surface, wherein the third side surface and the fourth side surface are disposed opposite to each other in a third direction;
  the transmission adjustment structure includes one adjustment member and one response member;
  the bracket structure includes two transmission adjustment structures, which are a first transmission adjustment structure and a second transmission adjustment structure;
  the first transmission adjustment structure is located at a position where the adjustment member of the second transmission adjustment structure is located between the supporting portion and the assembly portion and close to the third side surface, and one adjustment member and one response member included in the first transmission adjustment structure are located at two corner areas of the assembly portion close to the third side, respectively;
  the second transmission adjustment structure is located at a position where the adjustment member of the second transmission adjustment structure is located between the supporting portion and the assembly portion and close to the fourth side surface, and one adjustment member and one response member included in the second transmission adjustment structure are located at two corner areas of the assembly portion close to the fourth side, respectively.

In some embodiments, the bracket structure includes one transmission adjustment structure, and the transmission adjustment structure includes three response members;
  one adjustment member and the three response members included in the transmission adjustment structure are located in four corner areas of the assembly portion, respectively;
  the adjustment member is connected with the three response members by a same transmission member.

In some embodiments, the bracket structure further includes a third rotating member, wherein the third rotating member includes a fourth adjusting runner and a third screw disposed along the first direction; a fifth hole penetrating the assembly portion along the first direction is provided in a position of the assembly portion corresponding to the third screw; an internal thread matched with an external thread of the third screw is provided in the fifth hole;
  the fourth adjusting runner is located between the support portion and the assembly portion and close to the first side surface, at least a part of the fourth adjusting runner is located at the side of the first side surface away from the bracket body for external adjustment, the fourth adjusting runner is configured to rotate about the third rotation shaft in response to external adjustment;

the third screw is connected with the fourth adjusting runner and rotatable about the third rotation shaft following the fourth adjusting runner, so as to move along the fifth hole, and a part of the third screw is extendable from the side surface of the assembly portion away from the supporting portion through the third hole.

In some embodiments, the connection portion further has a second side disposed opposite to the first side in the second direction;

the transmission adjustment structure includes one adjustment member and one response member;

the bracket structure includes two transmission adjustment structures and two third rotating members, wherein the two transmission adjustment structures are a first transmission adjustment structure and a second transmission adjustment structure;

two third rotating members are located in two corner areas near the first side surface of the assembly portion, respectively;

one response member included in the first transmission adjustment structure and one response member included in the second transmission adjustment structure are located in two corner areas near the second side surface of the assembly portion, respectively;

one adjustment member included in the first transmission adjustment structure and one adjustment member included in the second transmission adjustment structure are located between the two third rotating members.

In some embodiments, an orthographic projection of the third rotating member on the support portion is located in an area in which the support portion is located.

In some embodiments, the transmission member includes a belt or a chain.

In some embodiments, an orthographic projection of the transmission adjustment structure on the support portion is located in the area in which the support portion is located.

In some embodiments, the support portion, the assembly portion and the connection portion are integrally formed.

In a second aspect, a sub-display panel assembly is further provided in an embodiment of the present disclosure, wherein the sub-display panel assembly includes the bracket structure as provided in the first aspect and a display substrate, and the support portion in the bracket structure carries the display substrate.

In a third aspect, a tiled display device is further provided in an embodiment of the present disclosure. The tiled display device includes a plurality of sub-display panel assemblies and a cabinet for assembling the sub-display panel assemblies, wherein at least one of the sub-display panel assemblies is the sub-display panel assembly provided in the second aspect.

DETAILED DESCRIPTION

Figure 1:
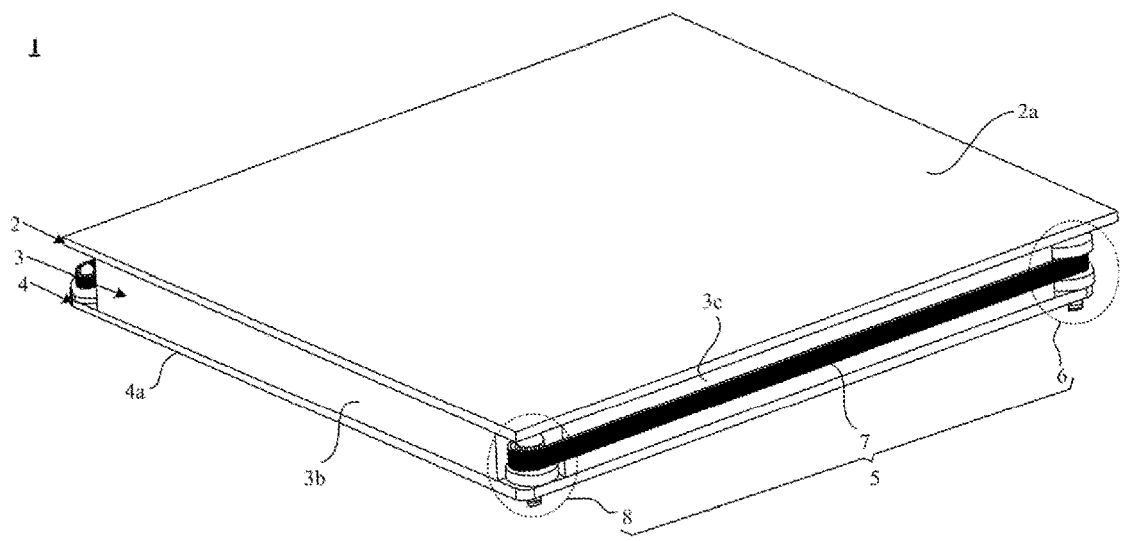
FIG. 1 is a schematic diagram of a structure of a bracket structure provided in an embodiment of the present disclosure.

To enable those skilled in the art to better understand technical solutions of the present disclosure, the present disclosure is described in further detail below in conjunction with the accompanying drawings and specific implementations.

The present disclosure will be described in more detail below with reference to the accompanying drawings. Throughout the figures, same elements are represented by similar reference numerals. For the sake of clarity, not all parts in the drawings are drawn to scale. In addition, some well-known parts may not be shown in the figures.

Many specific details of the present disclosure, such as structures, materials, dimensions, processing techniques and techniques of the components are described below in order to more clearly explain the present disclosure. However, as will be understood by those skilled in the art, the present disclosure may be implemented without these specific details.

"First", "second", and similar terms used in the embodiments of the present disclosure do not represent any order, quantity, or importance, but are only used for distinguishing different components. Likewise, terms such as "include", "contain" and the like mean that elements or objects appearing before the words cover elements or objects listed after the words and their equivalents, but do not exclude other elements or objects. Similar terms such as "connected" or "joined" between two structures include not only a direct contact of two structures to achieve connection, but also an indirect connection of two structures by other structures.

In addition, the formation of "fixed" two structures in the present disclosure merely means that the two structures cannot be separated in a certain state or moment, but the two structures may be separated in other states or moments. For example, when a screw is screwed into a corresponding screw hole, the screw is fixed to the screw hole, but the screw may be screwed out of the screw hole so that the screw is separated from the screw hole.

A tiled display device includes a cabinet and a plurality of sub-display panel assemblies mounted on the cabinet. Each sub-display panel assembly includes a display substrate and a bracket structure. The bracket structure is provided with a support surface, and a distance between the support surface and the cabinet is a support height of the bracket structure.

In a practical application, it is found that after the sub-display panel assembly is assembled on the cabinet, due to an assembly error and other factors in an assembly process, a support surface of an inner bracket structure of a currently assembled sub-display panel assembly is inclined, and an actual supporting height of the bracket structure deviates from a pre-designed supporting height, which leads to a segment difference between the support surface of the inner bracket structure of the currently assembled sub-display panel assembly and a support surface of an inner bracket structure of a sub-display panel assembly already assembled on the cabinet. At that time, a display surface of a display substrate in a presently assembled sub-display panel assembly is not on a same plane as a display surface of a display substrate in a sub-display panel assembly already assembled on the cabinet. When the tiled display device displays a picture, the picture in the area where at least two sub-display panel assemblies with segment difference are located leads to a concave-convex feeling or a split feeling, which greatly affects an overall picture display effect of the tiled display device.

In related technologies, when adjusting the segment difference between the support surfaces of the bracket structure, it is needed to disassemble the whole sub-display panel assembly from the cabinet, and then reassemble the sub-display panel assembly to the cabinet to adjust a position of the support surface of the inner bracket structure in the sub-display panel assembly, so as to eliminate the segment difference between the support surface of the inner bracket structure in the currently assembled sub-display panel assembly and the support surface of the inner bracket structure in the already assembled sub-display panel assembly on the cabinet, and the segment difference adjustment is achieved. However, in the related technologies, this mode of adjusting the segment difference by reassembling leads to a low assembly efficiency of the tiled display device. In addition, in the process of reassembly, there will inevitably be assembly errors, which make it difficult to adjust the segment error accurately, and may lead to a phenomenon that a same sub-display panel assembly has been reassembled many times.

In related technologies, it is also proposed to set an adjustment mechanism based on magnetic force or back top wire on the bracket structure to achieve the segment difference adjustment. However, due to complexity of an overall coordination solution, an actual field operation is difficult, and a front and rear adjustment space is limited. At the same time, it is affected sometimes by a back mounted bracket and cannot be effectively adjusted.

Figure 2:
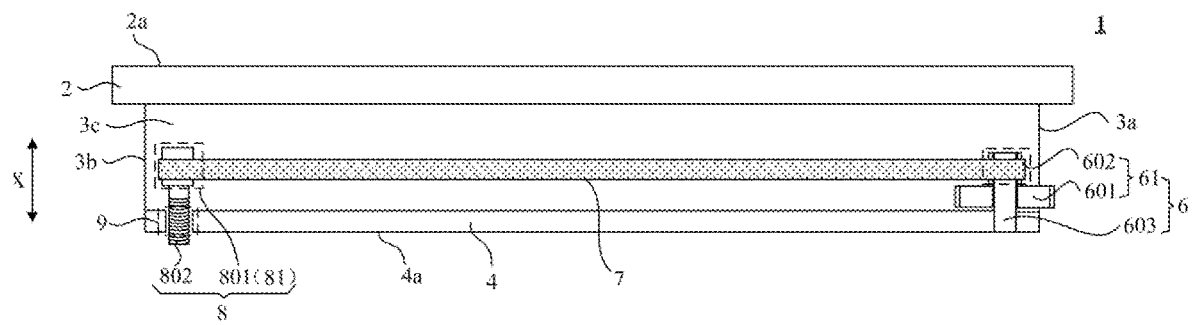
FIG. 2 is a cross-sectional view of a transmission adjustment structure according to an embodiment of the present disclosure.

FIG. 1 is a schematic diagram of a structure of a bracket structure provided in an embodiment of the present disclosure. FIG. 2 is a cross-sectional view of a transmission adjustment structure according to an embodiment of the present disclosure. As shown in FIGS. 1 and 2, the bracket structure includes a bracket body 1 and at least one transmission adjustment structure 5. The bracket body 1 includes a support portion 2, an assembly portion 4 and a connection portion 3. The support portion 2 and the assembly portion 4 are disposed opposite to each other in a first direction X. The connection portion 3 is located between the support portion 2 and the assembly portion 4 and is connected with both of the support portion 2 and the assembly portion 4, and the connection portion 3 has a first side surface 3a. The transmission adjustment structure 5 is located between the support portion 2 and the assembly portion 4, and includes an adjustment member 6, a transmission member 7 connected with the adjustment member 6 and a response member 8 connected with the transmission member 7. The adjustment member 6 is located between the support portion 2 and the assembly portion 4 and close to the first side surface 3a, and at least a part of the adjustment member 6 is located on a side of the first side surface 3a away from the bracket body 1 for external adjustment, and the adjustment member 6 is configured to drive, in response to the external adjustment, the transmission member 7 to move. A second hole 9 penetrating through the assembly portion 4 in the first direction X is provided at a position corresponding to the response member 8 in the assembly portion 4. The response member 8 is configured to move in the first direction X in the second hole 9 in response to a control of a movement of the transmission member 7, and a part of the response member 8 is able to extend from a side surface of the assembly portion 4 away from the support portion 2 through the second hole 9.

In an embodiment of the present disclosure, a support portion 2 on the bracket body 1 is a part of the bracket body 1 for supporting a display substrate, and a side surface of the support portion 2 away from the assembly portion 4 is a support surface 2a, on which the display substrate can be fixed. The assembly portion 4 of the bracket body 1 is a part of the bracket body 1 for assembling with a cabinet, and the assembly portion 4 has an assembly surface 4a which faces the cabinet and is assembled with the cabinet mutually.

In some embodiments, the support portion 2 and the assembly portion may be plate-shaped. In other embodiments, the support portion 2 may be a frame structure with a hollow area. A circuit structure (such as a Chip on Flex (COF for short), a Flexible Printed Circuit (FPC for short), etc.) located on a non-display surface of the display substrate can extend through the hollow area and be accommodated in a space enclosed by the support portion 2, the assembly portion 4, and the connection portion 3.

In some embodiments, the support portion 2, the assembly portion 4 and the connection portion 3 may be integrally formed. That is, the bracket body 1 is integrally formed.

Alternatively, the assembly portion 4 can be fixed with the cabinet by matching a positioning hole with a positioning column, magnetic attraction fixing, suction cup fixing, etc., so as to achieve assembly of the sub-display panel assembly and the cabinet. A fixing mode of the assembly portion 4 and the cabinet is not limited in the present disclosure.

In an embodiment of the present disclosure, when a position of the support surface 2a of the bracket structure is required to be adjusted to perform a segment difference adjustment, at least one adjustment member 6 can be adjusted so that an extension amount of at least one response member 8 extending from the side surface (i.e., the above-mentioned "assembly surface 4a") of the assembly portion 4 away from the support portion 2 changes. Since the support surface 2a and the assembly surface 4a are relatively fixed, a distance between the assembly surface 4a and a surface of the cabinet at a corresponding position can be adjusted by changing the extension amount of the response member 8 extending from the assembly surface 4a, so that the position of the support surface 2a of the bracket structure is changed, and thus the segment difference adjustment can be achieved. The larger the extension amount of the response member 8 extending from the assembly surface 4a, the greater the distance between the assembly surface 4a and the cabinet at the corresponding position. The smaller the extension amount of the response member 8 extending from the assembly surface 4a, the smaller the distance between the assembly surface 4a and the cabinet at the corresponding position.

In the embodiments of the present disclosure, when a segment difference problem occurs, the position of the bracket structure can be adjusted without disassembling the bracket structure from the cabinet, so that segment difference between support surfaces 2a of different bracket structures can be effectively adjusted. Compared with the related technologies, because a process of "disassembling first and then reassembling" is omitted in a segment difference adjustment solution in the present disclosure, a technical solution in the present disclosure can effectively improve an assembly efficiency of the tiled display device. Meanwhile, the technical solution in the present disclosure can accurately control the extension amount of the response member 8 from the assembly surface 4a, that is, the technical solution can accurately adjust the position of the support surface 2a of the bracket structure, so that the segment difference can be accurately adjusted.

Furthermore, due to the adjustment member 6 is located between the support portion 2 and the assembly portion 4 and near the first side surface 3a, and at least part of the adjustment member 6 is located on the side of the first side surface 3a away from the bracket body 1, so that the adjustment member 6 can be adjusted at the first side surface 3a. Therefore, in a process of adjusting the position of the support surface 2a of the bracket structure, there is no requirement for a mounting environment of front and rear sides of the sub-display panel assembly (a space on a side of the display substrate facing away from the bracket structure and a space on a side of the bracket structure facing away from the display substrate), so that the bracket structure has a strong application ability.

More importantly, due to presence of the transmission member 7, positions of both the adjustment member 6 and the response member 8 can be different. The response member 8 can be disposed in any area between the support portion 2 and the assembly portion 4. That is, the second hole 9, which is configured for extension of the response member 8, may be disposed at any position on the assembly surface 4a. In other words, an assembler can adjust the distance between the assembly surface 4a and the cabinet at any position on the assembly surface 4a (only need to dispose the response member 8 and the second hole 9 at a corresponding position) at the first side surface 3a, so as to achieve adjustment of the position of the bracket structure. In the present disclosure, members for an adjustment operation by an assembler are concentrated in the vicinity of the first side surface 3a so that an assembler is convenient to operate.

In some embodiments, the connection portion 3 further has a second side surface 3b disposed opposite to the first side surface 3a in a second direction Y, and the response member 8 is located between the support portion 2 and the assembly portion 4 and close to the second side surface 3b. In other words, an assembler can use the adjustment member 6 located near the first side surface 3a to control the extension amount of the response member 8 located near the second side surface 3b extending from the assembly surface 4a, and to adjust a distance between an area of the assembly 4a near the second side surface 3b and a surface of the cabinet. It will be described in detail with specific examples later.

In some embodiments, the adjustment member 6 includes a first rotating member 61 having a first rotation shaft. The first rotation shaft extends in a direction parallel to the first direction X, and the first rotating member 61 is configured to rotate on the first rotation shaft in response to external adjustment, and to drive the transmission member 7 to move. The response member 8 includes one or more second rotating members 81 connected with the transmission member 7. The first rotating member 61 has a second rotation shaft having an extending direction parallel to the first direction X. The second rotating member 81 is configured to rotate on the second rotation shaft in response to the control by movement of the transmission member 7, and to move along the second hole 9.

In some embodiments, the first rotating member 61 includes a first adjusting runner 601 and a first connecting runner 602 disposed along the first direction X. At least a part of the first adjusting runner 601 is located on a side of the first side 3a away from the bracket body 1 for the external adjustment, and the first adjusting runner 601 is configured to rotate on the first rotation shaft in response to the external adjustment (the first rotation shaft is parallel to the first direction X and passes through a geometric center of the first rotating member 601) and to drive the first connecting runner 602 to rotate synchronously on the first rotation shaft.

The second rotating member 81 includes a second connecting runner 801 and a second screw 802 disposed along the first direction X, wherein the second screw 802 extends along the first direction X, and an internal thread matched with an external thread of the second screw 802 is provided in the second hole 9.

The transmission member 7 is connected with both the first connecting runner 602 and the second connecting runner 801, and is configured to drive the second connecting runner 801 to rotate on the second rotation shaft in response to the first connecting runner 602 rotating on the first rotation shaft. The second screw 802 is connected with the second connecting runner 801 and can be rotated on the second rotation shaft to move along the second hole 9 following the second connecting runner 801. In this case, the second rotation shaft is a shaft that passes through the geometric center of a second screw 802 and is parallel to an extending direction of the second screw 802.

Referring to FIG. 2, in some embodiments, the adjustment member 6 further includes a first connecting rod 603 corresponding to the first rotating member 61. The first connecting rod 603 extends in the first direction X. One end of the first connecting rod 603 is connected with the assembly portion 4, and the first adjusting runner 601 and the first connecting runner 602 are sleeved outside the first connecting rod 603 so that the first adjusting runner 601 and the first connecting runner 602 can rotate on the first connecting rod 603. In this case, the first rotation shaft is a shaft which passes through a geometric center of the first connecting rod 603 and is parallel to an extending direction of the first connecting rod 603.

It should be noted that, in an embodiment of the present disclosure, the first connecting rod 603 and the assembly portion 4 may be fixedly connected or non-fixedly connected (for example, the first connecting rod 603 and the assembly portion 4 are connected by screw connection, clamping connection, etc.), which is not limited in the present disclosure. In FIG. 2, only a case in which the first connecting rod 603 is inserted into a hole of the assembly portion 4 to connect with the assembly portion 4 is illustrated by an example, and this case only serves as an example without limiting the technical solution of the present disclosure.

As shown in FIG. 2, an assembler can rotate the first adjusting runner 601 so that the first connecting runner 602 rotates synchronously on the first rotation shaft. Rotation of the first adjusting runner 601 drives the transmission member 7 to move, and the movement of the transmission member 7 drives the second connecting runner 801 to rotate on the second rotation shaft, while the second screw 802 follows the second connecting runner 801 to rotate on the second rotation shaft. Rotation of the second screw 802 causes the second screw 802 to move along the second hole 9. An extension amount of the second screw 802 from the assembly surface 4a changes, and the distance between the assembly surface 4a and the cabinet at a corresponding position can be changed.

Figure 3A:
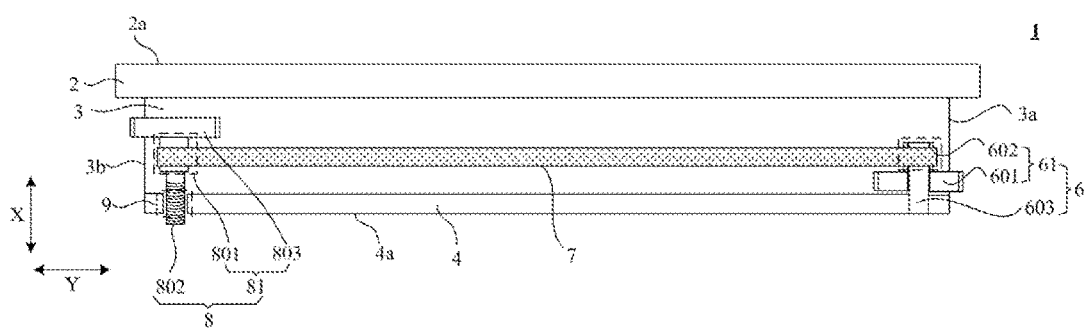
FIG. 3A is another cross-sectional view of a transmission adjustment structure according to an embodiment of the present disclosure.
Figure 3B:
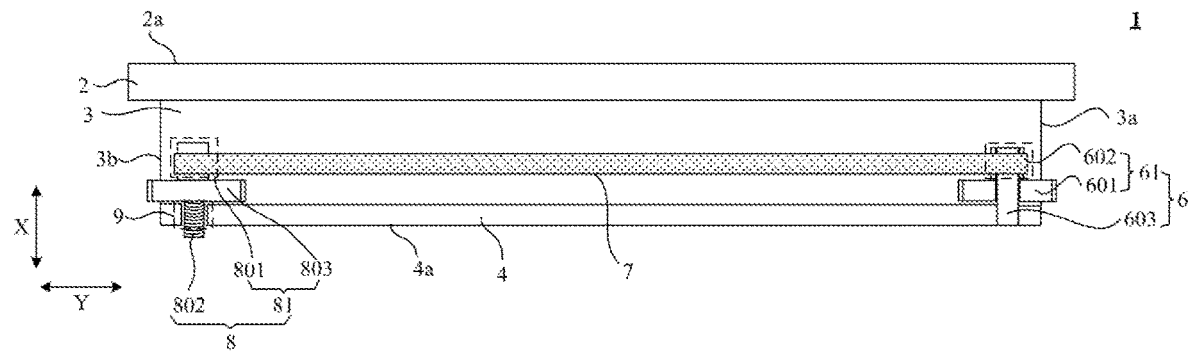
FIG. 3B is yet another cross-sectional view of a transmission adjustment structure according to an embodiment of the present disclosure.

FIG. 3A is another cross-sectional view of a transmission adjustment structure according to an embodiment of the present disclosure. FIG. 3B is yet another cross-sectional view of a transmission adjustment structure according to an embodiment of the present disclosure. As shown in FIGS. 3A and 3B, in some embodiments, the second rotating member 81 further includes a second adjusting runner 803, the second adjusting runner 803 and the second screw 802 are disposed along the first direction X. The second adjusting runner 803 is connected with the second connecting runner 801. The second adjusting runner 803 is located between the second connecting runner 801 and the second screw 802, or the second adjusting runner 803 is located at a side of the second connecting runner 801 away from the second screw 802. At least part of the second adjusting runner 803 is located in at least one side of the connection portion 3 away from the bracket body 1 for external adjustment. The second adjusting runner 803 is configured to rotate on the second rotation shaft in response to the external adjustment, and to drive the second screw 802 to rotate synchronously.

In the embodiment of the present disclosure, by providing the second adjusting runner 803 on the second rotating member 81, it is convenient for an assembler to assemble the second screw 802 into the corresponding second hole 9. In addition, the second adjusting runner 803 is provided so that an assembler can adjust in advance the extension amount of the second screw 802 from the assembly surface 4a directly by adjusting the second adjusting runner 803 before assembling the bracket structure to the cabinet.

Referring to FIG. 3A, in some embodiments, the second adjusting runner 803 is located on a side of the second connecting runner 801 away from the second screw 802.

Referring to FIG. 3B, in some embodiments, the second adjusting runner 803 is located between the second connecting runner 801 and the second screw 802.

Figure 4A:
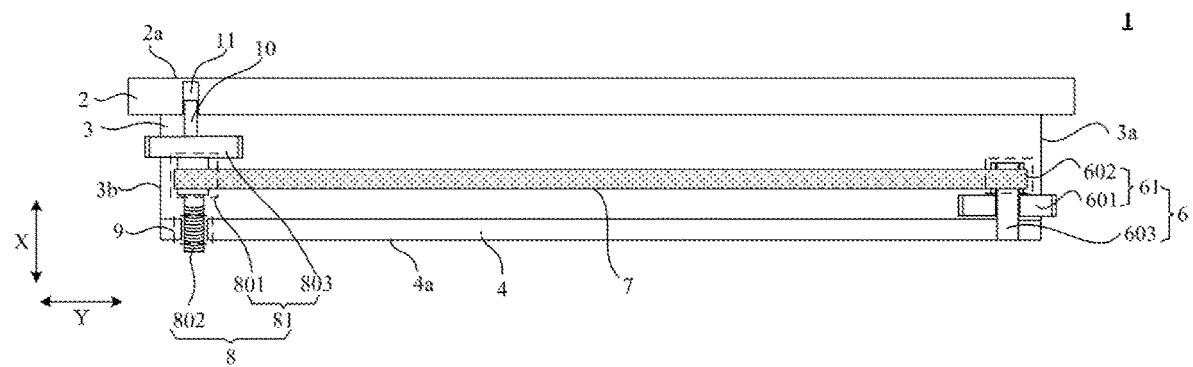
FIG. 4A is yet another cross-sectional view of a transmission adjustment structure according to an embodiment of the present disclosure.
Figure 4B:
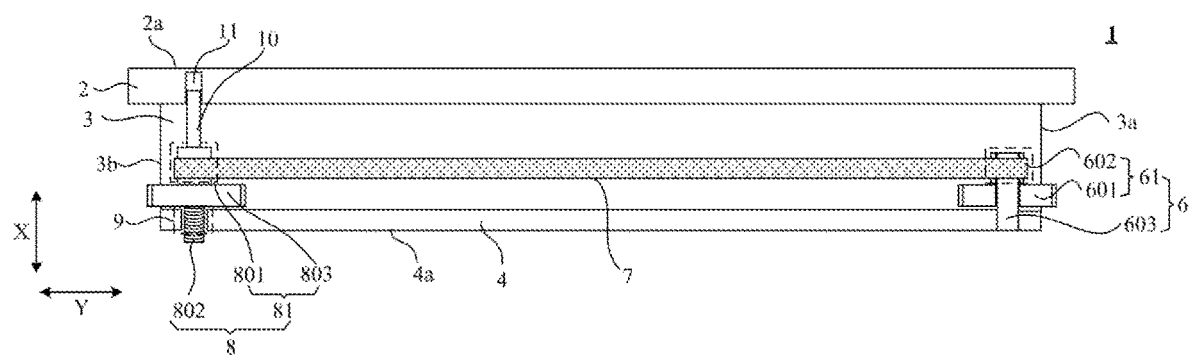
FIG. 4B is yet another cross-sectional view of a transmission adjustment structure according to an embodiment of the present disclosure.

FIG. 4A is another yet cross-sectional view of a transmission adjustment structure according to an embodiment of the present disclosure. FIG. 4B is another yet cross-sectional view of a transmission adjustment structure according to an embodiment of the present disclosure. As shown in FIGS. 4A and 4B, in some embodiments, a fourth hole 11 is provided at a position directly corresponding to the second hole 9, on a side surface of the support portion 2 facing the assembly portion 4. A second guide rod 2010 is provided on a side of the second rotating member 81 away from the second hole 9. An end of the second guide rod 2010 away from the support portion 2 is connected with the second rotating member 81. An end of the second guide rod 2010 close to the support portion 2 extends into a corresponding fourth hole 11 and is configured to be movable along the fourth hole 11.

In the present disclosure, arrangement of the fourth hole 11 and the second guide rod 2010 can improve stability of the second rotating member 81 during movement along the second hole 9.

It should be noted that the fourth hole 11 provided on the side surface of the support portion 2 facing the assembly portion 4 may be a via hole or a blind hole. It is only needed to ensure that an end of the second guide rod 2010 away from the second rotating member 81 does not exceed the support surface 2a during movement of the second rotating member 81 along the second hole 9, so as to prevent the second guide rod 2010 from contacting the display substrate located on the support surface 2a.

It should be noted that the first side surface in FIGS. 2 to 4B is an area indicated by the reference number 3a and is perpendicular to a plane presented in FIGS. 2 to 4B.

Figure 5A:
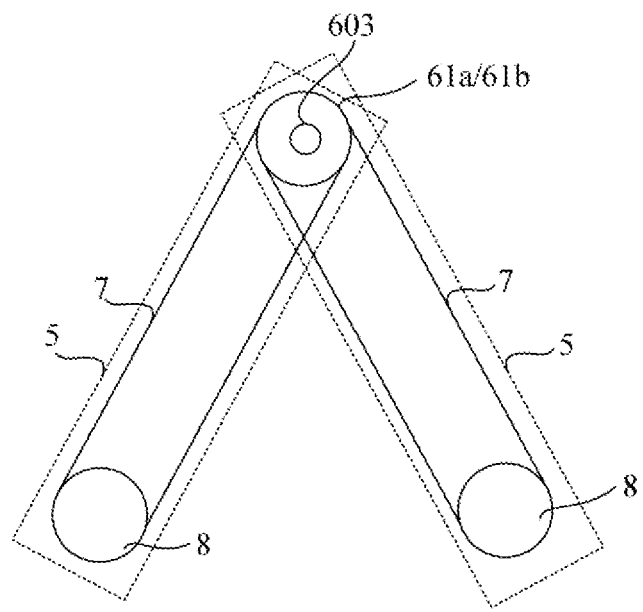
FIG. 5A is a schematic diagram of first rotating members in at least two transmission adjustment structures corresponding to a same first connecting rod according to an embodiment of the present disclosure.
Figure 5B:
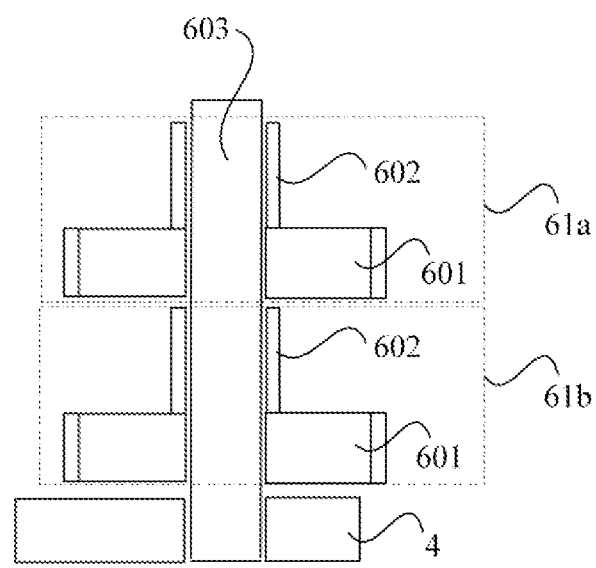
FIG. 5B is a cross-sectional view of at least two first rotating members in FIG. 5A being sleeved on the first connecting rod, in sequence.

FIG. 5A is a schematic diagram of first rotating members in at least two transmission adjustment structures corresponding to a same first connecting rod according to an embodiment of the present disclosure. FIG. 5B is a cross-sectional view of at least two first rotating members in FIG. 5A being sleeved on the first connecting rod, in sequence. As shown in FIGS. 5A and 5B, in some embodiments, the bracket structure includes at least two transmission adjustment structures 5. First rotating members 61a, 62b in the at least two transmission adjustment structures 5 corresponds to a same first connecting rod 603, and the first rotating members 61a, 61b corresponding to the same first connecting rod 603 are disposed in sequence in the first direction X.

Each of the first rotating members 61a and 61b sleeved on the same first connecting rod 603 corresponds to a same rotation shaft, and rotation of each of the first rotating members 61a and 61b is independent from each other. That is, an assembler can adjust the first rotating members 61a and 61b on the same first connecting rod 603, respectively.

It should be noted that only a case where the first rotating members 61a, 61b in two of the transmission adjustment structure 5 correspond to the same first connecting rod 603 is illustrated in FIGS. 5A and 5B, and three or more first rotating members may correspond to the same first connecting rod 603 in the present disclosure.

Figure 6A:
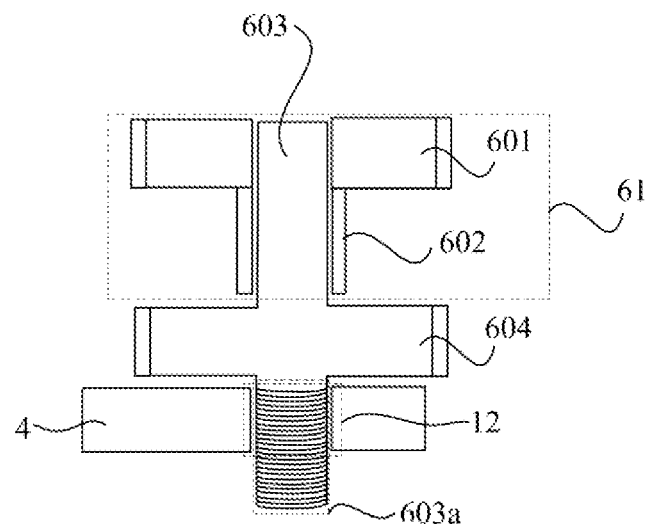
FIG. 6A is a cross-sectional view at an adjustment member according to an embodiment of the present disclosure.
Figure 6B:
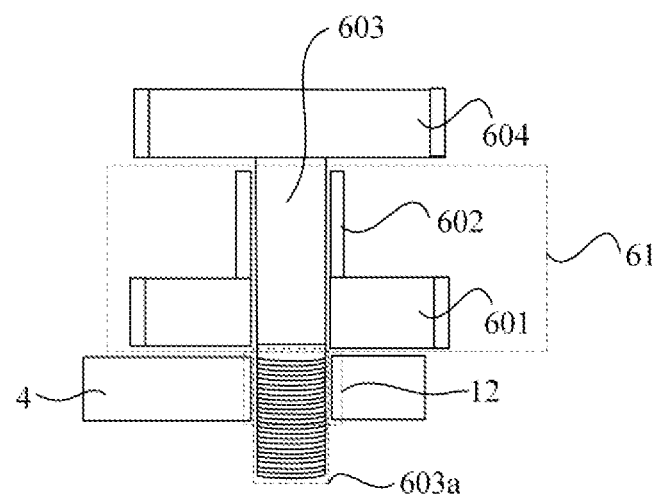
FIG. 6B is a cross-sectional view at another adjustment member according to an embodiment of the present disclosure.
Figure 6C:
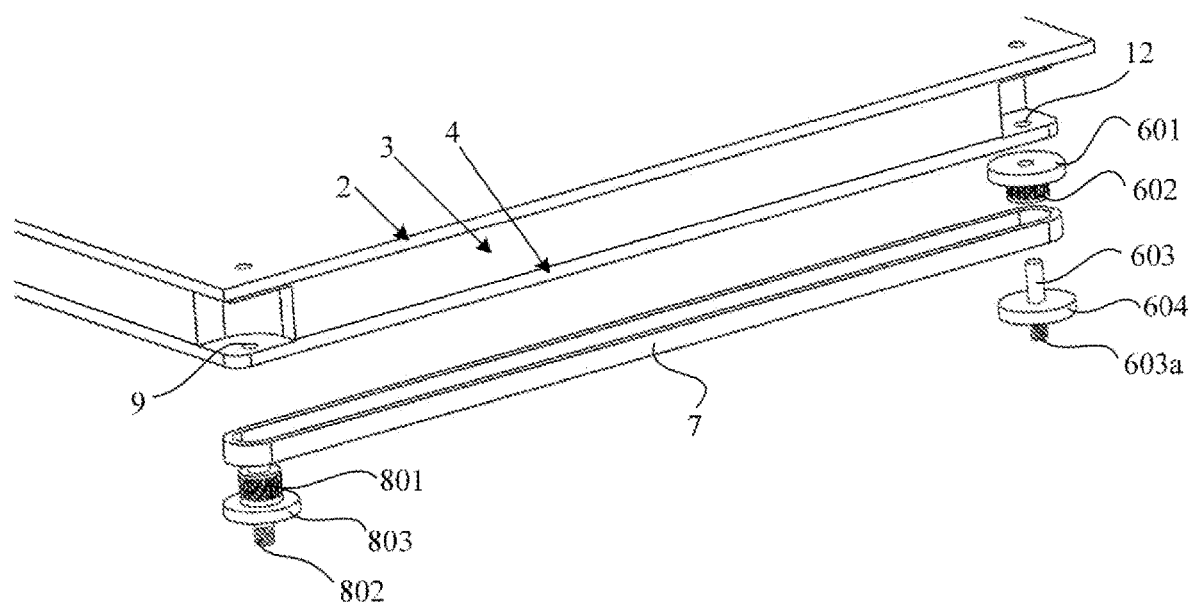
FIG. 6C is an exploded view of a structure of a transmission adjustment structure according to an embodiment of the present disclosure.

FIG. 6A is a cross-sectional view at an adjustment member according to an embodiment of the present disclosure. FIG. 6B is another cross-sectional view at an adjustment member according to an embodiment of the present disclosure. FIG. 6C is an exploded view of a structure of a transmission adjustment structure according to an embodiment of the present disclosure. As shown in FIGS. 6A to 6C, in some embodiments, the adjustment member 6 further includes a third adjusting runner 604 corresponding to the first connecting rod 603. The third adjusting runner 604 is connected with the corresponding first connecting rod 603, and at least a part of the third adjusting runner 604 is located on the side of the first side surface 3*a* away from the bracket body 1 for external adjustment. The third adjusting runner 604 is configured to rotate on the first rotation shaft in response to the external adjustment, and to drive the first connecting rod 603 to rotate on the first rotation shaft. A first hole 12 penetrating the assembly portion 4 in the first direction X is provided at a position corresponding to the first connecting rod 603 in the assembly portion 4. A part of the first connecting rod 603 away from the support portion 2 is a first screw 603*a*. Internal threads matched with external threads of the first screw 603*a* are provided in the first hole 12. The first screw 603*a* is configured to move along the first hole 12 when being rotated on the first rotation shaft, so that a part of the first screw 603*a* can extend from the side surface of the assembly portion 4 away from the support portion 2 through the first hole 12.

In the embodiment of the present disclosure, an extension amount of the first screw 603*a* from the first hole 12 can be adjusted by the third adjusting runner 604, so as to adjust the distance between the assembly surface 4*a* at the corresponding position and the surface of the cabinet.

Referring to FIG. 6A, in some embodiments, the third adjusting runner 604 is sleeved outside and fixed to the first connecting rod 603. Referring to FIG. 6B, in other embodiments, the third adjusting runner 604 is fixed to an end of the first connecting rod 603 away from the assembly portion 4. In the embodiment of the present disclosure, it is only needed to ensure that the third adjusting runner 604 is fixed to the first connecting rod 603 (including the first screw 603*a*) so as to drive the first connecting rod 603 to rotate about the first rotation shaft. During the first connecting rod 603 rotating on the first rotation shaft, rotation of the first connecting rod 603 does not drive the first rotating member 61 sleeved on the first connecting rod 603 to rotate.

Figure 7A:
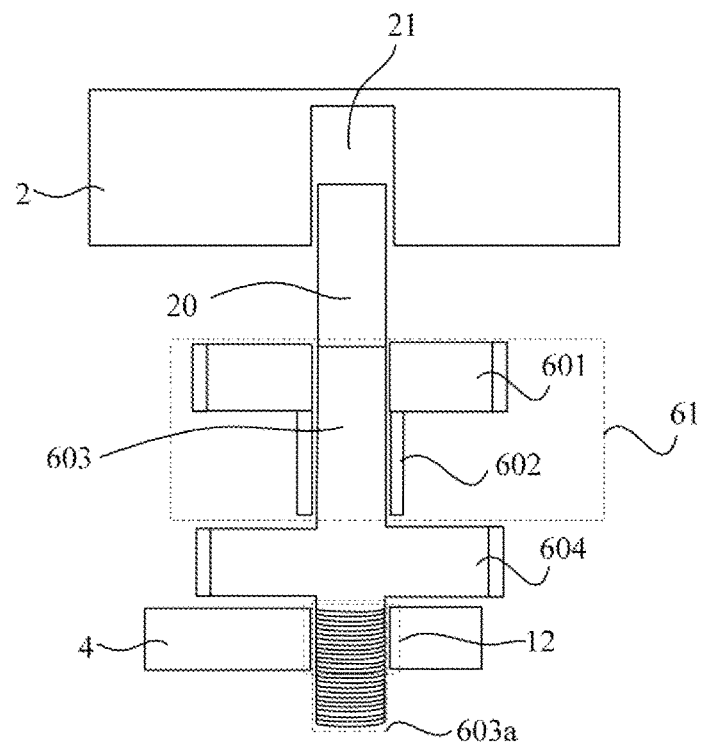
FIG. 7A is cross-sectional view at adjustment member according to an embodiment of the present disclosure.
Figure 7B:
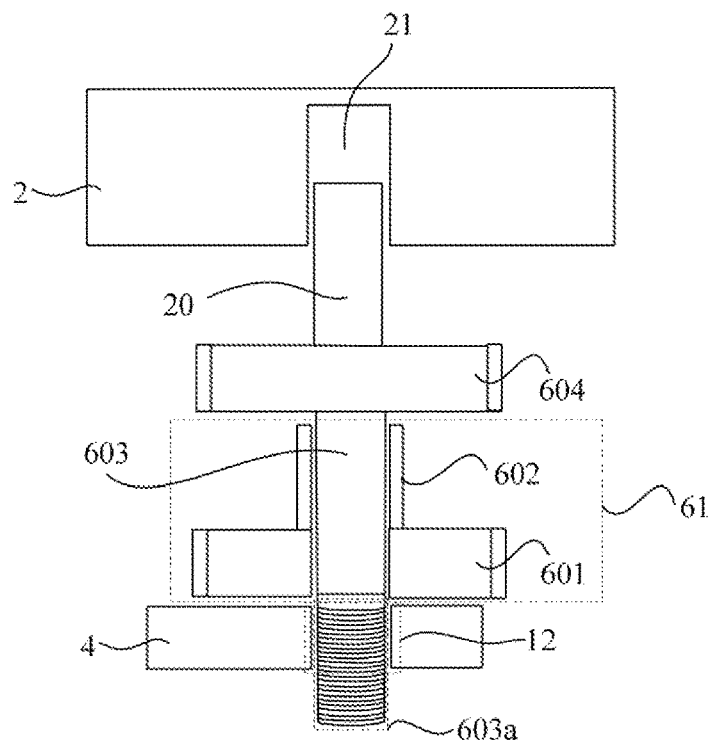
FIG. 7B is yet another cross-sectional view at adjustment member according to an embodiment of the present disclosure.

FIG. 7A is yet another cross-sectional view at adjustment member according to an embodiment of the present disclosure. FIG. 7B is yet another cross-sectional view at adjustment member according to an embodiment of the present disclosure. As shown in FIGS. 7A and 7B, in some embodiments, in a case where the third adjusting runner 604 is provided on the first connecting rod 603, a third hole 21 is provided at a position directly corresponding to the first hole 12, on the side surface of the support portion 2 facing the assembly portion 4. A first guide rod is provided on a side of the third adjusting runner 604 away from the first hole 12, an end of the second guide rod 2010 away from the support portion 2 is connected with the second rotating member 81, and an end of the second guide rod 2010 close to the support portion 2 extends into a corresponding third hole 21 and is configured to be movable along the third hole 21.

In the present disclosure, arrangement of the third hole 21 and the first guide rod can improve stability of the movement of the first connecting rod 603 in the first hole 12.

It should be noted that the third hole 21 provided on the side surface of the support portion 2 facing the assembly portion 4 may be a via hole or a blind hole. It is only needed to ensure that an end of the first guide rod away from the first hole 12 does not exceed the support surface 2*a* during the movement of the first connecting rod 603 along the first hole 12, so as to prevent the first guide rod from contacting with the display substrate on the support surface 2*a*.

In some embodiments, the first connecting rod 603 shown in FIG. 7A and the first guide rod may be integrally formed.

Figure 8:
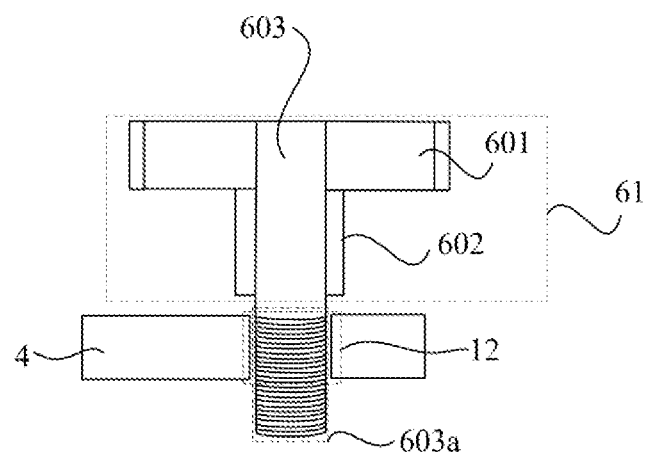
FIG. 8 is yet another cross-sectional view at adjustment member according to an embodiment of the present disclosure.

FIG. 8 is another yet cross-sectional view at adjustment member according to an embodiment of the present disclosure. As shown in FIG. 8, unlike the case where the first rotating member 61 is not fixed to the first connecting rod 603 and the first rotating member 61 is able to rotate on the first connecting rod 603 in the previous embodiments, in a case shown in FIG. 8, the first connecting rod 603 is fixed to a corresponding first rotating member 61 to follow the first rotating member 61 to rotate on the first rotation shaft. A first hole 12 penetrating the assembly portion 4 in the first direction X is provided at a position corresponding to the first connecting rod 603 in the assembly portion 4. A part of the first connecting rod 603 away from the support portion 2 is a first screw 603*a*. The first hole 12 is provided with internal threads matched with external threads of the first screw 603*a*. The first screw 603*a* is configured to move along the first hole 12 when being rotated on the first rotation shaft. A part of the first screw 603*a* can extend from a side surface of the assembly portion 4 away from the support portion 2 through the first hole 12.

That is, when the first rotating member 61 drives the second rotating member 81 to rotate to adjust the extension amount of the second screw 802 extending from the assembly surface 4*a*, the first rotating member 61 also drives the first connecting rod 603 (including the first screw 603*a*) to rotate to adjust synchronously the extension amount of the first screw 603*a* extending from the assembly surface 4*a*.

It should be noted that, in the embodiment of the present disclosure, the transmission adjustment structure 5 includes one adjustment member 6 (including one first rotating member 61), one transmission member 7 and one or more response members 8 (each response member 8 includes one second rotating member 81). In other words, in the present disclosure, a plurality of response elements 8 located at different positions can be adjusted synchronously by one adjustment element 6 at a same time. It will be described in detail with specific examples later.

Figure 9A:
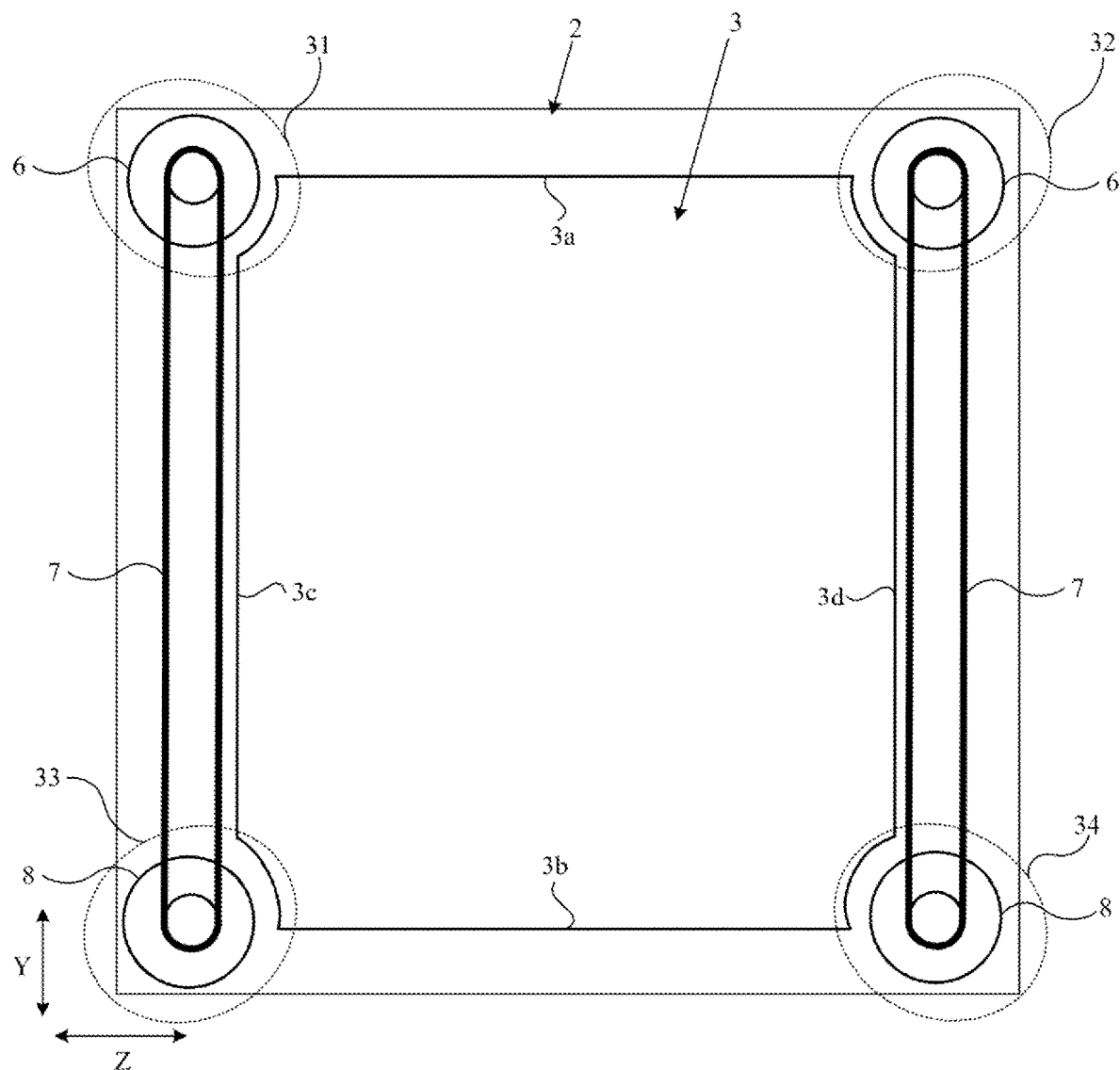
FIG. 9A is a schematic diagram of another structure of a bracket structure according to an embodiment of the present disclosure.
Figure 9B:
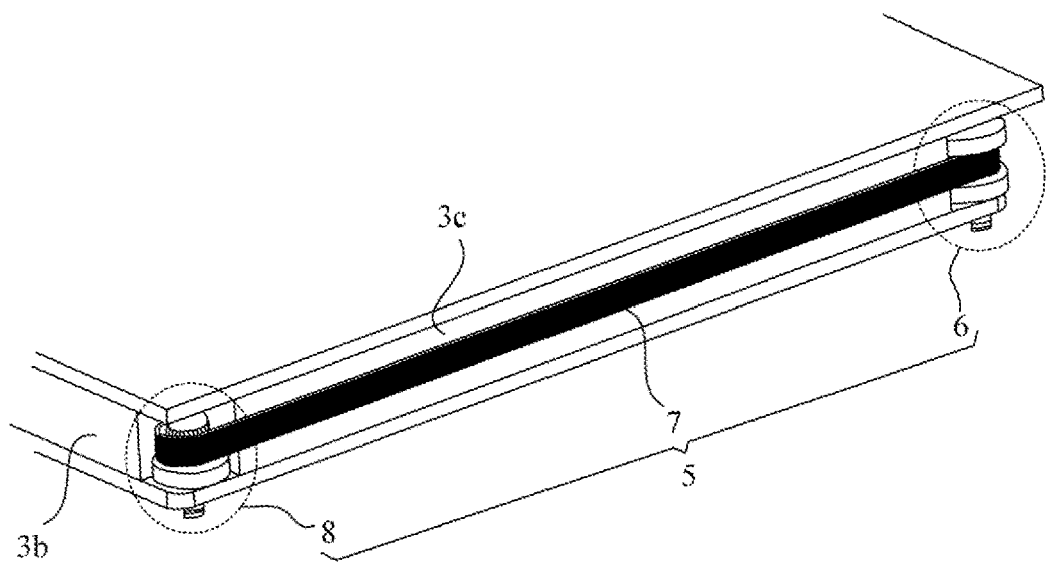
FIG. 9B is a schematic diagram of a structure at a fourth side surface in FIG. 9A.

FIG. 9A is a schematic diagram of another structure of a bracket structure according to an embodiment of the present disclosure, and FIG. 9B is a schematic diagram of a structure at a fourth side surface in FIG. 9A. As shown in FIGS. 9A and 9B, in some embodiments, the connection portion 3 further has a second side surface 3*b* disposed opposite to the first side surface 3*a* (at an upper position of the bracket body 1 in FIG. 9A) in the second direction Y (a vertical direction in FIG. 9A), and a third side surface 3*c* (at a position on the left of the bracket body 1 in FIG. 9A) and a fourth side surface 3*d* (at a position on the right of the bracket body 1 in FIG. 9A) connected with the first side surface 3*a*. The third side surface 3*c* and the fourth side surface 3*d* are disposed opposite to each other in a third direction Z (a horizontal direction in FIG. 9A). The transmission adjustment structure 5 includes an adjustment member 6 and a response member 8. The bracket structure includes two transmission adjustment structures 5, i.e., a first transmission adjustment structure 5 and a second transmission adjustment structure 5.

The first transmission adjustment structure 5 is located at a position where the adjustment member 6 of the first transmission adjustment structure 5 is located between the support portion 2 and the assembly portion 4 and close to the third side surface 3*c*, and one of the adjustment member 6 and one of the response members 8 included in the first transmission adjustment structure 5 are located at two corner areas 31, 33 of the assembly portion 4 close to the third side surface 3*c*, respectively.

The second transmission adjustment structure 5 is located at a position where the adjustment member 6 of the first transmission adjustment structure 5 is located between the support portion 2 and the assembly portion 4 and close to the fourth side surface 3*d*, and one of the adjustment member 6 and one of the response members 8 included in the first transmission adjustment structure 5 are located at two corner areas 32, 34 of the assembly portion 4 close to the fourth side surface 3*d*, respectively.

It should be noted that the adjustment member 6 in FIG. 9A may employ the structure described in any of the previous embodiments. For example, in some embodiments, the adjustment member 6 may include the first rotating member 61 and the first connecting member. In other embodiments, the adjustment member 6 may further include the third adjusting runner 604, in this case, distances between the assembly surface 4*a* and the cabinet at four corner areas 31, 32, 33 and 34 may be adjusted respectively.

The response member 8 in FIG. 9A may employ the structure described in any of the previous embodiments. For example, in some embodiments, the response member 8 may include the second rotating member 81. In other embodiments, the adjustment member 6 may further include the second adjusting runner 803.

Figure 10:
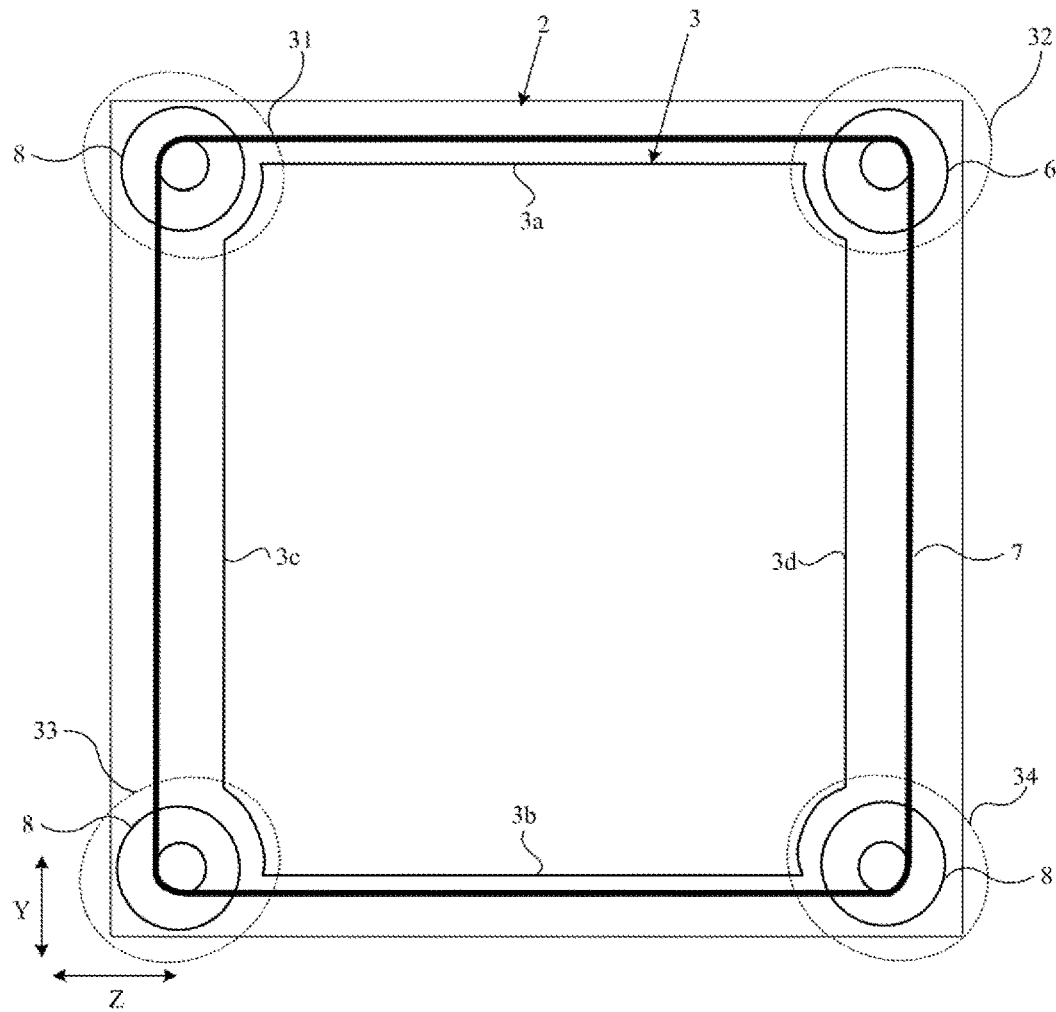
FIG. 10 is a schematic diagram of yet another structure of bracket structure according to an embodiment of the present disclosure.

FIG. 10 is yet another schematic diagram of a structure of a bracket structure according to an embodiment of the present disclosure. As shown in FIG. 10, in some embodiments, the bracket structure includes a transmission adjustment structure 5 which includes three response elements 8. An adjustment ember 6 and the three response members 8 included in the transmission adjustment structure 5 are located in the four corner regions 31, 32, 33 and 34 of the assembly portion 4, respectively. The adjustment member 6 is connected with the three response members 8 through a same transmission member 7. That is, movements of the three response members 8 can be controlled simultaneously by one adjustment member 6.

The structures of the adjustment member 6 and the response member 8 in FIG. 10 may also employ the structures described in any of the previous embodiments.

In some embodiments, when the first rotating member 61 in the transmission member 7 in FIG. 10 is fixed to the first connecting member and the first connecting member is screwed to the first hole 12 in the assembly portion 4 (for example, in the case shown in FIG. 8), the distances between the assembly surface 4*a* and the cabinet at the four corner areas can be adjusted simultaneously by the adjustment member 6.

Figure 11:
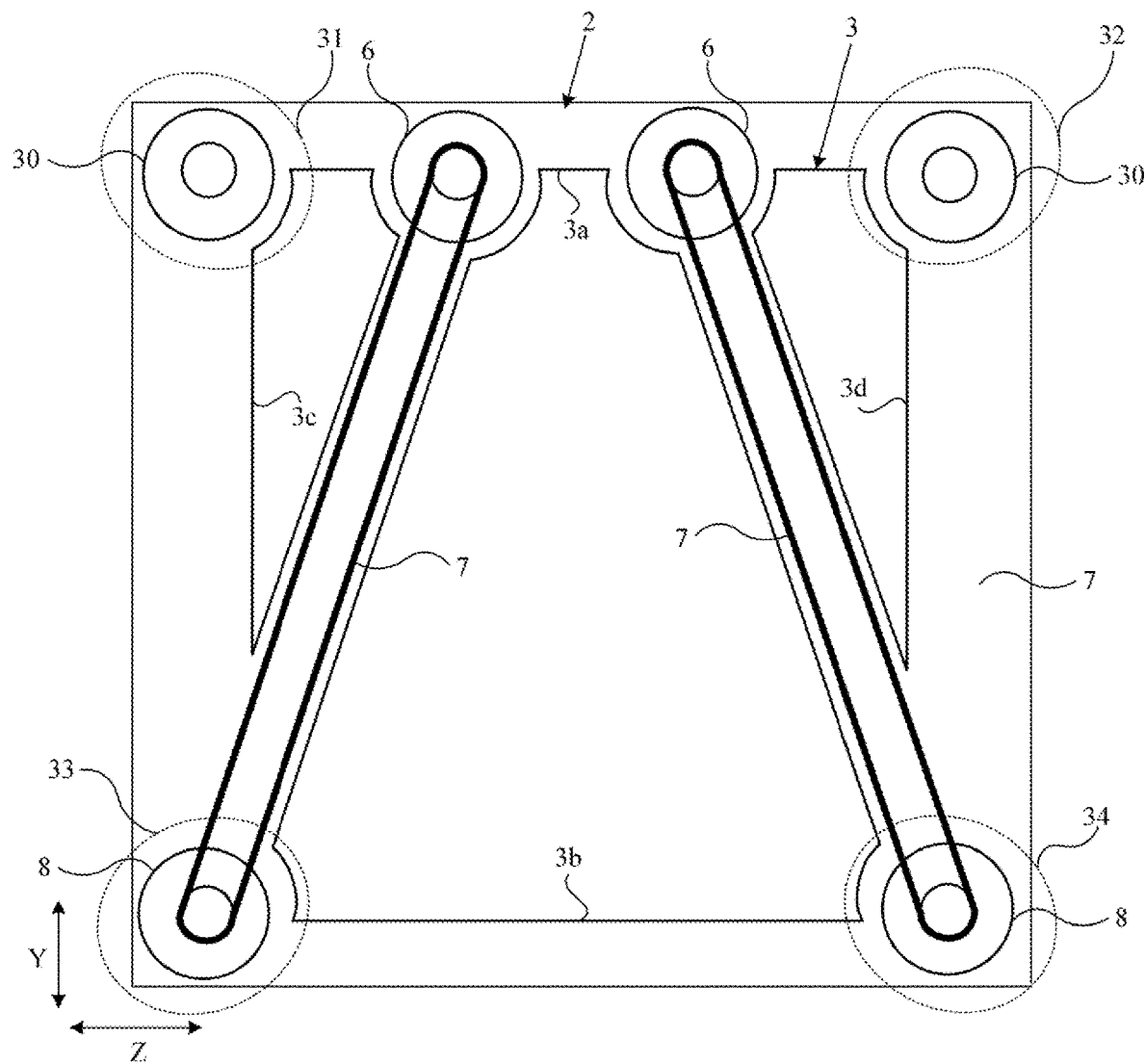
FIG. 11 is a schematic diagram of yet another structure of a bracket structure according to an embodiment of the present disclosure.
Figure 12:
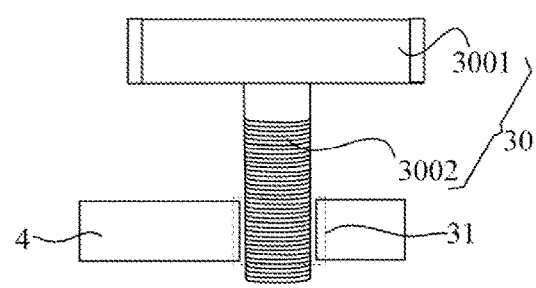
FIG. 12 is a cross-sectional view of a third rotating member according to an embodiment of the present disclosure.

FIG. 11 is another yet schematic diagram of a structure of a bracket structure according to an embodiment of the present disclosure. FIG. 12 is a cross-sectional view of a third rotating member according to an embodiment of the present disclosure. As shown in FIGS. 11 and 12, in some embodiments, the bracket structure further includes a third rotating member 30. The third rotating member 30 includes a fourth adjusting runner 3001 and a third screw 3002 disposed along the first direction X. A fifth hole 31 which penetrates the assembly portion 4 along the first direction X is provided at a position corresponding to the third screw 3002 in the assembly portion 4, and an internal thread matched with an external thread of the third screw 3002 is disposed in the fifth hole 31. The fourth adjusting runner 3001 is located between the support portion 2 and the assembly portion 4 and close to the first side surface 3*a*, at least a part of the fourth adjusting runner 3001 is located at the side of the first side surface 3*a* away from the bracket body 1 for external adjustment, and the fourth adjusting runner 3001 is configured to rotate on a third rotation shaft in response to the external adjustment. The third screw 3002 is connected with the fourth adjusting runner 3001 and can follow the fourth adjusting runner 3001 to rotate around the third rotation shaft, to move along the fifth hole 31, and a part of the third screw 3002 can extend from a side surface of the assembly portion 4 away from the support portion 2 through the third hole 21.

In some embodiments, the transmission adjustment structure 5 includes one adjustment member 6 and one response member 8. The bracket structure includes two transmission adjustment structures 5 and two third rotating members 30. The two transmission adjustment structures 5 are a first transmission adjustment structure 5 and a second transmission adjustment structure 5; The two third rotating members 30 are located respectively in two corner areas 31 and 32 of the assembly portion 4 adjacent to the first side surface 3*a*. A response member 8 included in the first transmission adjustment structure 5 and a response member 8 included in the second transmission adjustment structure 5 are located respectively in two corner areas 33 and 34 of the assembly portion 4 close to the second side surface 3*b*. An adjustment member 6 included in the first transmission adjustment structure 5 and an adjustment member 6 included in the second transmission adjustment structure 5 are located between the two third rotating members 30.

In some embodiments, an orthogonal projection of the third rotating member 30 is located in an area where the support portion 2 is located to avoid an influence of the third rotating member 30 on other bracket structures on the cabinet during a subsequent tiling process.

In a solution shown in FIG. 11, the distances between the assembly surface 4*a* and the cabinet at the upper left corner 31 and the upper right corner 32 of the bracket structure can be adjusted by two third rotating members 30. The distances between the assembly surface 4*a* and the cabinet at the lower left corner area 33 and the lower right corner area 34 of the bracket structure can be adjusted by two transmission adjustment structures 5.

It should be noted that an outline of the assembly portion is not schematically shown in FIGS. 9A, 10 and 11. In addition, in an embodiment of the present disclosure, the connection portion 3 may be in a plate shape or a hollow structure.

In the above-mentioned embodiments, optionally, the transmission member 7 includes a belt or a chain. Accordingly, the first connecting runner 602 and the second connecting runner 801 may be a belt runner or a chain runner.

In the above-mentioned embodiments, an orthographic projection of the transmission adjustment structure 5 on the support portion 2 is located in the area where the support portion 2 is located, so as to avoid an influence of the transmission adjustment structure 5 on other bracket structures on the cabinet in a subsequent splicing process.

In the present disclosure, different structures in the above-mentioned different embodiments can be combined with each other, and a new technical solution obtained through the combination should also belong to the protection scope of the present disclosure.

Based on the same inventive concept, a sub-display panel assembly is further provided in an embodiment of the present disclosure. The sub-display panel assembly includes a bracket structure and a display substrate. A support surface of the bracket structure carries the display substrate. The bracket structure may be the bracket structure provided in any of the above-mentioned embodiments.

Based on the same inventive concept, a tiled display device is further provided in an embodiment of the present disclosure. The tiled display device includes a plurality of sub-display panel assemblies and a cabinet for assembling the sub-display panel assemblies, wherein at least one of the sub-display panel assemblies is the sub-display panel assembly provided in any of the above-mentioned embodiments.

According to the embodiments of the present invention as described above, these embodiments are not exhaustively described in all detail nor are the present invention limited to the specific embodiments described. Obviously, according to the above description, many modifications and changes can be made. These embodiments selected and specifically described in this specification are in order to better explain the principles and practical applications of the present invention, thereby those skilled in the art can make good use of the present invention and modifications based on the present invention. The present invention is limited only by the claims and full scope thereof and equivalents.

The invention claimed is:

1. A bracket structure, comprising a bracket body and at least one transmission adjustment structure, wherein:
the bracket body comprises a supporting portion, an assembly portion and a connecting portion, wherein the supporting portion and the assembly portion are disposed opposite in a first direction, the connecting portion is located between the supporting portion and the assembly portion and is connected with both the supporting portion and the assembly portion, and the connecting portion comprises a first side surface;
the transmission adjustment structure is located between the supporting portion and the assembly portion, and comprises an adjustment member, a transmission member connected with the adjustment member and a response member connected with the transmission member;
the adjustment member is located between the supporting portion and the assembly portion and close to the first side surface, at least a part of the adjustment member is located at a side of the first side surface away from the bracket body for external adjustment, and the adjustment member is configured to drive the transmission member to move in response to the external adjustment; and
a second hole penetrating the assembly portion in the first direction is provided in a position of the assembly portion corresponding to the response member, the response member is configured to move along the second hole in response to a control of movement of the transmission member, and a part of the response member is capable of extending from a side surface of the assembly portion away from the support portion through the second hole.

2. The bracket structure of claim 1, wherein the connection portion further comprises a second side surface disposed opposite to the first side surface in a second direction, and the response member is located between the support portion and the assembly portion and close to the second side.

3. The bracket structure of claim 1, wherein:
the adjustment member comprises a first rotating member having a first rotating shaft, wherein the first rotating shaft is extended in a direction parallel to the first direction, and the first rotating member is configured to rotate on the first rotating shaft in response to the external adjustment and drive the transmission member to move;
the response member comprises one or more second rotating members connected with the transmission member, the first rotating member comprises a second rotational shaft that is extended in a direction parallel to the first direction, and the second rotating member is configured to rotate on the second rotational shaft in response to the control of the movement of the transmission member and to move along the second hole.

4. The bracket structure of claim 3, wherein:
the first rotating member comprises a first adjusting runner and a first connecting runner disposed in the first direction, at least a part of the first adjusting runner is located on a side of the first side surface away from the bracket body for external adjustment, and the first adjusting runner is configured to rotate on the first rotation shaft in response to external adjustment and to drive the first connecting runner to rotate synchronously on the first rotation shaft;
the second rotating member comprises a second connecting runner and a second screw disposed along the first direction, wherein the second screw is extended along the first direction, and an internal thread matched with an external thread of the second screw is provided in the second hole;
the transmission member is connected with both the first connecting runner and the second connecting runner, and the transmission member is configured to drive the second connecting runner to rotate on the second rotation shaft in response to the first connecting runner rotating on the first rotation shaft;
the second screw is connected with the second connecting runner and is capable of following the second connecting runner to rotate on the second rotating shaft, to move along the second hole.

5. The bracket structure of claim 4, wherein:
the response member further comprises a second adjusting runner, and the second adjusting runner and the second screw are disposed along the first direction;
the second adjusting runner is connected with the second connecting runner, and the second adjusting runner is located between the second connecting runner and the second screw, or the second adjusting runner is located on a side of the second connecting runner away from the second screw; and
at least part of the second adjusting runner is located on a side of at least one side surface of the connecting portion away from the bracket body for external adjustment, and the second adjusting runner is configured to rotate along the second rotating shaft in response to the external adjustment and drive the second screw to rotate synchronously.

6. The bracket structure of claim 3, wherein:
a fourth hole is provided at a position directly corresponding to the second hole, on a side surface of the support portion facing the assembly portion;
a second guide rod is provided on a side of the second rotating member away from the second hole, an end of the second guide rod away from the support portion is connected with the second rotating member, an end of the second guide rod close to the support portion is extended into a corresponding fourth hole and is configured to be movable along the fourth hole.

7. The bracket structure of claim 3, wherein:
the adjustment member further comprises a first connecting rod corresponding to the first rotating member, and the first connecting rod is extended in the first direction; and
one end of the first connecting rod is connected with the assembly portion, and the first adjusting runner and the first connecting runner are sleeved outside the first connecting rod, and the first adjusting runner and the first connecting runner rotate on the first connecting rod.

8. The bracket structure of claim 7, wherein:
the bracket structure comprises at least two transmission adjustment structures; and
first rotating members in the at least two transmission adjustment structures correspond to a same first connecting rod, and each of the first rotating members corresponding to the same first connecting rod is disposed in sequence along the first direction.

9. The bracket structure of claim 7, wherein:
the adjustment member further comprises a third adjusting runner corresponding to the first connecting rod, wherein the third adjusting runner is connected with the corresponding first connecting rod, at least a part of the third adjusting runner is located on a side of the first side away from the bracket body for external adjustment, and the third adjusting runner is configured to rotate on the first rotation shaft in response to the external adjustment and to drive the first connecting rod to rotate on the first rotation shaft; and
a first hole penetrating the assembly portion along the first direction is provided in a position of the assembly portion corresponding to the first connecting rod, a part of the first connecting rod away from the supporting portion is a first screw, an internal thread matched with an external thread on the first screw is provided in the first hole, the first screw is disposed to move along the first hole when rotating on the first rotating shaft, and a part of the first screw is capable of extending from the side surface of the assembly portion away from the supporting portion through the first hole.

10. The bracket structure of claim 9, wherein:
the third adjusting runner is sleeved outside the first connecting rod and fixed to the first connecting rod; or
the third adjusting runner is fixed at one end of the first connecting rod away from the assembly portion.

11. The bracket structure of claim 9, wherein:
a third hole is provided at a position directly corresponding to the first hole, on a side surface of the support portion facing the assembly portion; and
a first guide rod is provided on a side of the third adjusting runner away from the first hole, an end of the second guide rod away from the support portion is connected with the second rotating member, an end of the second guide rod close to the support portion is extended into a corresponding third hole and is configured to be movable along the third hole.

12. The bracket structure of claim 3, wherein:
the adjustment member further comprises a first connecting rod corresponding to the first rotating member, the first connecting rod is extended in the first direction, and the first connecting rod is fixed to a corresponding first rotating member to follow the first rotating member to rotate on the first rotation shaft; and
a first hole penetrating the assembly portion along the first direction is provided in a position of the assembly portion corresponding to the first connecting rod, a part of the first connecting rod away from the supporting portion is a first screw, an internal thread matched with an external thread on the first screw is provided in the first hole, the first screw is disposed to move along the first hole when rotating on the first rotating shaft, and a part of the first screw is capable of extending from the side surface of the assembly portion away from the supporting portion through the first hole.

13. The bracket structure of claim 3, wherein:
the connection portion further comprises a third side surface and a fourth side surface connected to the first side surface, wherein the third side surface and the fourth side surface are disposed opposite to each other in a third direction;
the transmission adjustment structure comprises one adjustment member and one response member;
the bracket structure comprises two transmission adjustment structures, which are a first transmission adjustment structure and a second transmission adjustment structure;
the first transmission adjustment structure is located at a position where the adjustment member of the first transmission adjustment structure is located between the supporting portion and the assembly portion and close to the third side surface, and one adjustment member and one response member comprised in the first transmission adjustment structure are located at two corner areas of the assembly portion close to the third side, respectively; and
the second transmission adjustment structure is located at a position where the adjustment member of the second transmission adjustment structure is located between the supporting portion and the assembly portion and close to the fourth side surface, and one adjustment member and one response member comprised in the second transmission adjustment structure are located at two corner areas of the assembly portion close to the fourth side, respectively.

14. The bracket structure of claim 3, wherein:
the bracket structure comprises one transmission adjustment structure, and the transmission adjustment structure comprises three response members;
one adjustment member and the three response members comprised in the transmission adjustment structure are located in four corner areas of the assembly portion, respectively; and
the adjustment member is connected with the three response members by a same transmission member.

15. The bracket structure of claim 3, further comprising a third rotating member, wherein:
the third rotating member comprises a fourth adjusting runner and a third screw disposed along the first direction; a fifth hole penetrating the assembly portion along the first direction is provided in a position of the assembly portion corresponding to the third screw; an internal thread matched with an external thread of the third screw is provided in the fifth hole;
the fourth adjusting runner is located between the support portion and the assembly portion and close to the first side surface, at least a part of the fourth adjusting runner is located at the side of the first side surface away from the bracket body for external adjustment, the fourth adjusting runner is configured to rotate on the third rotation shaft in response to the external adjustment; and
the third screw is connected with the fourth adjusting runner and rotatable on the third rotation shaft following the fourth adjusting runner, and moves along the fifth hole, and a part of the third screw is extendable from the side surface of the assembly portion away from the supporting portion through the third hole.

16. The bracket structure of claim 15, wherein:
the connection portion further comprises a second side disposed opposite to the first side in the second direction;
the transmission adjustment structure comprises one adjustment member and one response member;
the bracket structure comprises two transmission adjustment structures and two third rotating members, wherein the two transmission adjustment structures are a first transmission adjustment structure and a second transmission adjustment structure;
two third rotating members are located in two corner areas close to the first side surface of the assembly portion, respectively;
one response member comprised in the first transmission adjustment structure and one response member comprised in the second transmission adjustment structure are located in two corner areas close to the second side surface of the assembly portion, respectively; and one adjustment member comprised in the first transmission adjustment structure and one adjustment member comprised in the second transmission adjustment structure are located between the two third rotating members.

17. The bracket structure of claim 15, wherein an orthographic projection of the third rotating member on the support portion is located in an area in which the support portion is located.

18. The bracket structure of claim 1, wherein the transmission member comprises a belt or a chain.

19. A sub-display panel assembly, comprising a bracket structure of claim 1 and a display substrate, wherein the support portion in the bracket structure carries the display substrate.

20. A tiled display device, comprising a plurality of sub-display panel assemblies and a cabinet for assembling the sub-display panel assemblies, wherein at least one of the sub-display panel assemblies is the sub-display panel members of claim 19.

* * * * *